United States Patent [19]

Malgarini et al.

[11] 3,917,480

[45] Nov. 4, 1975

[54] PROCESS FOR PREPARING THE FEED SOLID CHARGE FOR FLUID BED REACTORS

[75] Inventors: Giansilvio Malgarini; Emilio Marino; Edoardo Pasero, all of Rome, Italy

[73] Assignee: Centro Sperimentale Metallurgico S.p.A., Rome, Italy

[22] Filed: July 3, 1974

[21] Appl. No.: 485,569

[30] Foreign Application Priority Data
Aug. 6, 1973 Italy .................................. 51856/73

[52] U.S. Cl. .............................. 75/26; 75/9; 75/34
[51] Int. Cl.² ........................................... C22B 1/10
[58] Field of Search............................. 75/9, 26, 34

[56] References Cited
UNITED STATES PATENTS

| | | | |
|---|---|---|---|
| 2,958,596 | 11/1960 | Purvance | 75/9 |
| 3,251,678 | 5/1966 | Mayer | 75/26 |
| 3,383,200 | 5/1968 | Volk | 75/26 |
| 3,776,533 | 12/1973 | Vlnaty | 75/26 |

*Primary Examiner*—Peter D. Rosenberg
*Attorney, Agent, or Firm*—Young & Thompson

[57] ABSTRACT

A process for preparing the solid charge to be fed into fluidized bed reactors, wherein from the raw material a first fraction of fines is removed for an amount comprised between 20 and 70% of the total fines content, said fraction being subsequently united to a second fraction of fines drawn off from the reaction fluidized bed and then micropellettized, the so produced micropellets being united to the original material remaining after the removal of said first fraction of fines, and together with said material used as a charge for the fluidized bed reactors.

9 Claims, No Drawings

PROCESS FOR PREPARING THE FEED SOLID CHARGE FOR FLUID BED REACTORS

The present invention relates to a process for preparing the solid charge to be fed into fluidized bed reactors.

More specifically, this invention relates to those processes wherein the solid charge for the fluidized beds contains initially a remarkable percent of fines, or is friable thereby causing said fines to be produced during the treatment itself.

In these cases, the material having a very fine particle size will be carried out of the reactor by the fluidizing gas (thus causing the yield of the processes to decrease, causing foulings in the gas system downstream of the reactor, and other drawbacks) or else it compels the operation to be carried out at very low specific flow rates of the gas, which lowers the plant output and does not entirely eliminate the problem of the carrying over of the fines.

The gas-solids reaction processes in a fluidized bed, even if known for a long time, are becoming more important only now, and this late interest is due both to the technological difficulties of setting up said processes, and to the equipment cost.

Over the last few years, however, some particular economical situations along with the possibility, peculiar of the fluidized bed processes, of treating materials which are unfit for the conventional processes, aroused interest in these fluidized-bed processes.

For instance, in the steel industry, the always increasing availability of iron ores with a high content of fines or anyway with a poor physical stability, along with other technical and economical reasons, makes feasible the installation of units for an economical production of iron sponge by ore direct reduction.

However, the conditions which made interesting the fluidized-bed treatment processes, namely the possibility of utilizing raw materials either with a high content of fines or which cause the formation of said fines by physical degradation within the reactors, comprise one of the greatest drawbacks of said processes. In them, actually it is advisable to increase the amount of the reactive gas present within the reactor in order to favourably displace the equilibrium of the reaction and to allow a greater velocity of the treatment. This can be achieved by increasing the specific flow rate of the reactive gas, which causes an increase of gas velocity and therefore of the entrainement capacity of said gas, whereby an expansion of the fluid bed is obtained with an escape from the reactor of the particulate solids which increase in size with the increase of gas velocity.

Of course, the escape of particulate solids from the reactor is a phenomenon which cannot be entirely avoided, and which, however, in relation either to the particular nature of certain types of charge or to determined ranges of particle size of said charge, can reach such an importance as to adversely affect the regular operation of the plant. To this problem it is necessary to add that of the utilization of the drawn off fines, which due to their particle size cannot be easily used in processes of conventional type.

The present invention has for its primary object the elimination of said drawbacks, allowing on the one hand the utilization in fluidized-bed gas-solids reaction processes, materials which contain, either actually or potentially, even remarkable percents of fines, and on the other hand the operation in the reactor with greater specific gas flow rates thus improving the productivity.

According to the present invention, the charge material for the reactor will be subjected to a pre-treatment wherein a portion of the fines, variable from 20 to 70 percent of all the fines present will be separated from the charge. This pretreatment, according to the kind of the material, can consist of a simple screening and/or fluidized-bed treatment, with an inert fluidizing gas, with pre-heating and possible drying and dehydration of the material, namely removing from the material itself the residual humidification and crystallization water. The fines thus removed are recovered and sent to a suitable pelletizing plant, where said fines will be transformed into micropellets having a size less than 1.5 mm. Said micropellets are united to the material drawn off from the pre-treatment plant and the whole is sent to the fluidized-bed reactors proper. Due to this pretreatment it is also possible to increase, in the reactors, the specific flow rate of the fluidizing and reactive gas. This increase of the specific flow rate allows, as from the first bed of the fluidized reactor, further fractions of fines remaining in the charge to be removed, said fractions being united to those produced in the screening and/or to those removed during the pretreatment, and the whole being then subjected to the micropelletization treatment. The so produced micropellets can be utilized in their green state, or they can be either dried or fired. Thus a charge material will be obtained for the fluidized bed reactors consisting of the raw material which has been deprived of a high percent of the fines, and of the micropellets produced by said fines. This allows not only a more stable fluidizing bed to be obtained, but also greater yields and a greater productivity.

The present invention will be described in greater detail in relation to an embodiment thereof disclosed by way oc non limitative example and concerning the direct reduction of iron ores.

According to the present invention, a Venezuelan iron ore containing 64% Fe and 5% crystallization water suitably prepared in order to obtain a maximum particle size of 2 mm and 55% by weight of fines less than 0.2 mm, has been fed into a fluidized-bed pretreatment vessel using combustion products as fluidizing agent, and has been subjected to heating at temperatures comprised between 400°C and 500°C. By said pre-treatment the crystallization water has been removed obtaining a product containing about 67% Fe, and the fines that have been removed are about 58% of the amount of fines present in the original charge. The ore discharged from said vessel has been sent to a set of fluidized-bed reduction reactors using dry hydrogen as reactive and fluidizing gas. In the first of said reactors other fines with particle size lower than 0.2 mm in an amount corresponding to 20% of the amount of fines initially present in the ore, have been drawn off from the exhausted gas, said fines being practically non reduced.

Said fines have been added to those coming from the pre-treatment equipment and sent to the micropelletization equipment where pellets have been obtained with 1 mm average particle size. These pellets have been then added to the ore having greater dimensions discharged from the pre-treatment plant and sent to the reduction beds.

The present invention has been described with particular reference to specific embodiments thereof, it

Having thus described the present invention, what is claimed is:

1. A process for preparing a solid particulate charge to be fed into fluidized bed reactors, comprising the steps of separating from said solid particulate charge a first fraction of fines which are between 20 and 70% of the total fines present in the charge material, thus leaving a second fraction of charge material, feeding said second fraction of charge material to a fluidized bed reactor, withdrawing from said fluidized bed reactor fines suspended in fluidizing gas, separating a second fraction of fines from said withdrawn fluidizing gas, admixing said first and second fractions of fines, micropelletizing said admixed fines, and feeding the thus-obtained micropellets as charge material to said fluidized bed reactor.

2. A process as claimed in claim 1, and feeding said micropellets to said reactor in green state.

3. A process as claimed in claim 1, and drying said pellets before feeding said pellets to said reactor.

4. A process as claimed in claim 1, and cooking said pellets before feeding said pellets to said reactor.

5. A process as claimed in claim 1, in which said fines have a maximum particle size of 0.2 mm.

6. A process as claimed in claim 1, in which said micropellets have a size less than 1.5 mm.

7. A process as claimed in claim 1, in which said pellets have an average particle size of about 1 mm.

8. A process as claimed in claim 1, in which said solid charge has a maximum particle size of 2 mm.

9. A process for preparing a ferrous solid charge to be fed into iron ore direct reduction fluidized bed reactors, comprising the steps of separating from a solid charge of particulate iron ore a first fraction of fines which are between 20 and 70% of the total fines present in the charge material, thus leaving a second fraction of charge material, said separating being effected in a fluidized bed fluidized with hot combustion products whereby the charge material is heated to 400–500°C., feeding said second fraction of charge material to a direct reduction fluidized bed reactor, withdrawing from said fluidized bed reactor fines suspended in fluidizing gas, separating a second fraction of fines from said withdrawn fluidizing gas, admixing said first and second fractions of fines, micropelletizing said admixed fines, and feeding the thus-obtained micropellets as charge material to said fluidized bed reactor.

* * * * *